United States Patent [19]

Maxson et al.

[11] Patent Number: 5,665,794

[45] Date of Patent: Sep. 9, 1997

[54] METHOD FOR CONTROLLING CURE INITIATION AND CURING TIMES OF PLATINUM GROUP METAL CURING FLUOROSILICONE COMPOSITIONS

[75] Inventors: Myron Timothy Maxson, Midland; Lee Walter Miller, Bay City, both of Mich.

[73] Assignee: Dow Corning Corporation, Midland, Mich.

[21] Appl. No.: 650,386

[22] Filed: May 20, 1996

[51] Int. Cl.$^6$ .................................................. C08K 9/00
[52] U.S. Cl. ........................... 523/209; 523/212; 528/15; 524/493; 524/789
[58] Field of Search ........................ 528/15; 524/493, 524/789; 523/209, 212

[56] References Cited

U.S. PATENT DOCUMENTS

| | | |
|---|---|---|
| 3,159,601 | 12/1964 | Ashby . |
| 3,220,972 | 11/1965 | Lamoreaux . |
| 3,296,291 | 1/1967 | Chalk et al. . |
| 3,419,593 | 12/1968 | Willing . |
| 3,455,420 | 7/1969 | Blanchard . |
| 3,516,946 | 6/1970 | Modic . |
| 3,814,730 | 6/1974 | Karstedt . |
| 3,928,629 | 12/1975 | Chandra et al. . |
| 3,989,667 | 11/1976 | Lee et al. . |
| 3,989,668 | 11/1976 | Lee et al. . |
| 4,584,361 | 4/1986 | Janik et al. . |
| 4,732,931 | 3/1988 | Maxson . |
| 4,784,879 | 11/1988 | Lee et al. . |
| 4,818,805 | 4/1989 | Ikeno et al. . |
| 4,857,564 | 8/1989 | Maxson . |
| 5,036,117 | 7/1991 | Chung et al. . |

*Primary Examiner*—Melvyn I. Marquis
*Attorney, Agent, or Firm*—William F. Boley

[57] ABSTRACT

A method for controlling cure initiation and curing time of a platinum group metal curable fluorosilicone composition. The method comprises in a platinum group metal curable fluorosilicone composition comprising a cross-linker mixture comprising an alkylhydrogensiloxane and a dialkylhydrogen perfluoroalkylethylsiloxane controlling the weight ratio of the alkylhydrogensiloxane to dialkylhydrogen perfluoroalkylethylsiloxane in the mixture within a range of about 0.1:1 to 9:1 to control the cure initiation and curing time of the composition.

27 Claims, No Drawings

METHOD FOR CONTROLLING CURE INITIATION AND CURING TIMES OF PLATINUM GROUP METAL CURING FLUOROSILICONE COMPOSITIONS

BACKGROUND OF INVENTION

The present invention is a method for controlling cure initiation time and curing time of a platinum group metal curable fluorosilicone composition. The method comprises in a platinum group metal curable fluorosilicone composition comprising a cross-linker mixture comprising an alkylhydrogensiloxane and a dialkylhydrogen perfluoroalkylethylsiloxane controlling the weight ratio of the alkylhydrogensiloxane to dialkylhydrogen perfluoroalkylethylsiloxane in the mixture within a range of about 0.1:1 to 9:1 to control the cure initiation and curing time of the composition.

It is known in the art that fluorosilicone elastomers maintain desirable physical properties over a wide temperature range and have good resistance to hydrocarbons such as gasoline and engine oil. Therefore, fluorosilicone elastomers are useful as gasket and seals in a wide variety of applications. The ability to mold such gaskets, seals, and other articles from fluorosilicone compositions accurately and quickly is necessary for cost competitiveness of such moldings. For moldings prepared from fluorosilicone compositions to be cost competitive it is necessary that the compositions have a cure initiation time sufficient to allow complete filling of a mold cavity and then for the composition to cure rapidly allowing for a rapid cycle time for the molding operation.

It is also known that fluorosilicone compositions can be cured by an addition-type reaction using a platinum catalyst and an alkylhydrogensiloxane as a cross-linker. Generally, the use of an alkylhydrogensiloxane as cross-linker in fluorosilicone compositions provides for a composition that has a relatively long cure initiation and cure time. Therefore, although such compositions can provide for a complete filling of a mold cavity prior to cure initiation, the molding cycle time is slow.

Ikeno et al., U.S. Pat. No. 4,818,805, discuss the issue relating to the relative slow cure initiation and curing time of fluorosilicone compositions using an alkylhydrogensiloxane as cross-linker. Ikeno et al. describe the use of an unique siloxane cross-linker containing silicon-bonded hydrogen atoms, fluorine substituted organic substituents bonded to silicon, and a divalent organic group with both valencies bonded to separate silicon atoms for curing of fluorosilicone compositions. The siloxane cross-linker described by Ikeno et al. is report to provide for a quick cure initiation and fast curing of fluorosilicone compositions.

Maxson, U.S. Pat. No. 4,732,931 and U.S. Pat. No. 4,857,564 describes platinum curing fluorosilicone compositions comprising a dialkylhydrogen trifluoropropylsiloxane cross-linker having repeating units described by formula

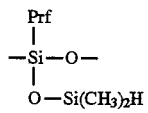

where Prf represents a 3,3,3-trifluoropropyl group. The compositions described by Maxson are known to have fast cure initiation and curing times. The disadvantage of these fast cure initiation times is that large or complex molds may not have time to fill completely before curing is initiated. This results in a large number of device rejects.

The present invention provides a method where the cure initiation and cure time of a platinum curing fluorosilicone composition can be tailored over a significant range to allow for accurate and rapid molding of fluorosilicone devices. The method comprises in a cross-linker mixture controlling the weight ratio of an alkylhydrogensiloxane to dialkylhydrogen perfluoroalkylethylsiloxane within a range of about 0.1:1 to 9:1. An important aspect of this invention is the discovery that the ratio of the cross-linkers can be varied within the described range while maintaining acceptable physical properties of the cured fluorosilicone elastomer.

SUMMARY OF INVENTION

A method for controlling cure initiation and curing time of a platinum group metal curable fluorosilicone composition. The method comprises in a platinum group metal curable fluorosilicone composition comprising a cross-linker mixture comprising an alkylhydrogensiloxane and a dialkylhydrogen perfluoroalkylethylsiloxane controlling the weight ratio of the alkylhydrogensiloxane to dialkylhydrogen perfluoroalkylethylsiloxane in the mixture within a range of about 0.1:1 to 9:1 to control the cure initiation and curing time of the composition.

DESCRIPTION OF INVENTION

The present invention is a method for controlling cure initiation and curing time of a platinum group metal curable fluorosilicone composition. The method comprises in a platinum group metal curable fluorosilicone composition comprising a cross-linker mixture comprising an alkylhydrogensiloxane and a dialkylhydrogen perfluoroalkylethylsiloxane controlling the weight ratio of the alkylhydrogensiloxane to dialkylhydrogen perfluoroalkylethylsiloxane in the mixture within a range of about 0.1:1 to 9:1 to control the cure initiation and curing time of the composition. In a preferred embodiment of the present method the fluorosilicone composition comprises:

(A) 100 weight parts of a fluorine-containing polydiorganosiloxane comprising at least two alkenyl radicals per molecule and repeating units described by formula $R^1R^fSiO$ and optionally $R^1R^2SiO$, where $R^1$ is an alkyl radical comprising from one to about four carbon atoms, $R^2$ is an alkenyl radical comprising from two to about 10 carbon atoms, and $R^f$ is a perfluoroalkylethyl radical comprising from three to about 12 carbon atoms, (B) 10 to 70 weight parts of a treated reinforcing silica filler, (C) an amount of a platinum group metal-containing hydrosilation catalyst sufficient to effect curing of the composition, and (D) 0.5 to 10 weight parts of a cross-linker mixture comprising an alkylhydrogensiloxane and a dialkylhydrogen perfluoroalkylethylsiloxane at a weight ratio within a range of about 0.1:1 to 9:1.

The curable fluorosilicone compositions of the present invention require the presence of a fluorine-containing polydiorganosiloxane comprising at least two alkenyl radicals per molecule and repeating units described by formula $R^1R^fSiO$ and optionally $R^1R^2SiO$, where $R^1$, $R^2$ and $R^f$ are as previously described. The fluorine-containing polydiorganosiloxane can be a polymer or mixture of polymers described by formula

where $R^1$, $R^2$, and $R^f$ are as previously described, each Q is independently selected from a group consisting of $R^1$, $R^2$ and OH, a≧0, a/(a+b)=0 to 0.05, and a+b is a value such that the polymer has a Williams plasticity number within a range of about 75 mm/100 to 400 mm/100 at 25° C. as determined by ASTM D926. The substituent $R^1$ of the fluorine-containing polydiorganosiloxane can be, for example, methyl, ethyl, propyl, and tert-butyl. Preferred is where $R^1$ is methyl. The substituent $R^2$ can be, for example, vinyl, allyl, pentenyl, hexenyl. and decenyl. Preferred is where $R^2$ is vinyl. The substituent $R^f$ is a perfluoroalkylethyl radical where the silicon atom is separated from the perfluoroalkyl radical by two non-fluorinated carbon atoms. The perfluoroalkyl portion of $R^f$ can contain from one to about 10 carbon atoms. $R^f$ can be, for example, perfluoromethyl, perfluoroethyl, perfluorobutyl and perfluorooctyl. Preferred is when $R^f$ is 3,3,3-trifluoropropyl. In formula (1) it is preferred that Q be selected from a group consisting of methyl, vinyl, and hydroxy. In formula (1) it is most preferred that Q be hydroxy. In formula (1) subscript a can be a value of zero or greater. Preferred is when subscript a is a value such that a/(a+b) is within a range of about 0.002 to 0.05. More preferred is when subscript a is a value such that a/(a+b) is within a range of about 0.005 to 0.01.

In formula (1) it is preferred that a+b be a value such that the polymer or mixture of polymers has a Williams plasticity number within a range of about 100 mm/100 to 400 mm/100 at 25° C. More preferred is when the Williams plasticity number is within a range of about 200 mm/100 to 400 mm/100 at 25° C. In a preferred fluorine-containing polydiorganosiloxane for use in compositions of the present invention $R^1$ is methyl, $R^f$ is 3,3,3-trifluoropropyl, Q is a hydroxy radical, subscript a is a value such that a/(a+b) is about 0.01, and a+b is a value such that the fluorine-containing polydiorganosiloxane has a Williams plasticity number within a range of about 200 mm/100 to 300 mm/100 at 25° C.

The platinum curable fluorosilicone compositions of the present method require the presence of 10 to 70 weight parts of a treated reinforcing silica filler per 100 weight parts of the fluorine-containing polydiorganosiloxane (component A). The treated reinforcing silica filler improves the physical strength of the cured fluorosilicone elastomers prepared from the composition. Preferred is when the present composition comprises about 30 to 50 weight parts of the treated reinforcing silica filler per 100 weight parts of component (A). The reinforcing silica filler can be of the fumed or precipitated type and should have a BET surface area of at least about 50 m²/g. Preferred is when the reinforcing silica filler is of the fumed type. Preferred is when the reinforcing silica filler has a surface area greater than about 100 m²/g. Even more preferred is when the reinforcing silica filler has a surface area within a range of about 200 m²/g to 400 m²/g.

The reinforcing silica filler of the present composition is treated with one or more low molecular weight organosilicon compounds to prevent a phenomenon referred to as "creping" or "crepe harding". These silica treating agents reduce the interaction between the fluorine-containing polydiorganosiloxane and the reinforcing silica filler that causes the curable composition to undergo an increase in viscosity during blending and storage of the composition, to the extent that the composition is difficult to process using conventional techniques and equipment. Those skilled in the art will recognize that the treating agent or agents may also serve to improve physical properties of the cured fluorosilicone elastomers prepared from the present compositions.

Suitable silica treating agents are well known in the art and include, for example, liquid silanol-containing organosilicon compounds and organosilicon compounds such as organodisilazanes that can be hydrolyzed to form these compounds under the conditions used to treat the silica.

Hydrolyzable precursors of silanol-containing silica treating agents include, for example, cyclic polydiorganosiloxanes, silazanes, and linear polydiorganosiloxanes containing alkoxy or other readily hydrolyzable groups. Preferred silica treating agents are selected from a group described by formula

  (2)

and

  (3)

where $R^1$, $R^2$, and $R^f$ are as previously described, x is a value greater than one, and y is a value greater than one. A preferred treating agent described by formula (2) is where $R^1$ is methyl, $R^f$ is 3,3,3-trifluoropropyl, and x is a value such that the treating agent has a viscosity of about 100 mPa.s at 25° C. A preferred treating agent described by formula (3) is where $R^1$ is methyl, $R^2$ is vinyl, and y is a value such that the treating agent has a viscosity of about 35 mPa.s at 25° C. In the present compositions it is preferred that the reinforcing silica filler be treated with 20 to 50 weight percent, based on the weight of the silica filler, of the treating agent described by formula (2). More preferred is when the reinforcing silica filler is treated with about 30 to 40 weight percent, based on the weight of the silica, of the treating agent described by formula (2). In the present compositions the reinforcing silica filler can be treated with 0 to 10 weight percent, based on the weight of the filler, of a treating agent described by formula (3). Preferred is when the reinforcing silica filler is treated with about 1 to 5 weight percent, based on the weight of the silica, of a treating agent described by formula (3). In the present compositions it is most preferred that the reinforcing silica filler be treated with 30 to 40 weight percent of the treating agent described by formula (2) and 1 to 5 weight percent of the treating agent described by formula (3), based on the weight of the silica. The reinforcing silica can be pretreated with one or more treating agent prior to addition to the composition or may be treated in situ.

The curable fluorosilicone compositions of the present method require the presences of a catalytic amount of a platinum group metal-containing hydrosilation catalyst. The platinum group metal-containing catalyst can be any of those known to catalyze the reaction of silicon-bonded hydrogen atoms with silicon-bond alkenyl groups. By "platinum group metal" it is meant ruthenium, rhodium, palladium, osmium, iridium, and platinum. Examples of useful platinum group metal-containing catalysts can be found in Lee et al., U.S. Pat. No. 3,989,668; Chang et al., U.S. Pat. No. 5,036,117; Ashby, U.S. Pat. No. 3,159,601; Lamoreaux, U.S. Pat. No. 3,220,972; Chalk et al., U.S. Pat. No. 3,296,291; Modic, U.S. Pat. No. 3,516,946; Karstedt, U.S. Pat. No. 3,814,730; and Chandra et al., U.S. Pat. No. 3,928,629 all of which are hereby incorporated by reference to show useful platinum group metal-containing catalyst and methods for their preparation.

The preferred platinum group metal for use as a catalyst to effect cure of the present compositions by hydrosilation is platinum. Therefore, a preferred catalyst for curing the present compositions is selected from a group consisting of platinum metal, platinum compounds, and platinum complexes. Platinum compounds such as chloroplatinic acid, chloroplatinic acid hexahydrate, and platinum dichloride and particularly complexes of such compounds with low-molecular weight vinyl-containing organosiloxanes are one group of preferred catalysts. These complexes are described in Willing, U.S. Pat. No. 3,419,593, which is hereby incorporated by reference for its teaching of such complexes. Complexes of platinum compounds with low-molecular weight organosiloxanes where the silicon bonded hydrocarbon radicals are vinyl and either methyl or 3,3,3-trifluoropropyl are particularly preferred because of their ability to catalyze a rapid curing of the present compositions at temperatures greater than about 70° C.

The most preferred catalysts for use in the present compositions are those where the platinum group metal-containing catalyst, particularly when the platinum group metal is platinum, is microencapsulated in a matrix or coreshell type structure. The platinum group metal-containing catalyst can be encapsulated, for example, in a dimethylphenylsiloxane resin. Microencapsulated platinum group metal-containing catalyst along with methods for their preparation are described in Lee et al., U.S. Pat. 4,784,879, which is incorporated by reference for its teaching of such catalysts useful in the present compositions.

The platinum group metal-containing catalyst may be added to the present compositions in an amount equivalent to as little as 0.001 part by weight of elemental platinum group metal per one millions parts (ppm) of the composition. Preferably, the concentration of platinum group metal in the composition is that providing the equivalent of a least 1 ppm of elemental platinum group metal in the composition. A catalyst concentration providing the equivalent of about 3 to 25 ppm of elemental platinum group metal in the composition is preferred.

The present invention is a method for controlling cure initiation and curing time of a platinum group metal curable fluorosilicone composition. Therefore, the compositions prepared by the method can be tailored to provide an initiation time sufficient to allow a mold to be completely fill with the composition before curing restricts flow in the mold and to provide for a rapid cure time thereafter to allow for a rapid cycle time for the molding process. The present inventors have unexpectly found that cure initiation time and curing time can be controlled by use of a cross-linker mixture comprising an alkylhydrogensiloxane and a dialkylhydrogen perfluoroalkylethylsiloxane where the ratio of the alkylhydrogensiloxane to dialkylhydrogen perfluoroalkylethylsiloxane is controlled within a range of about 0.1:1 to 9:1. Generally, increasing the amount of alkylhydrogensiloxane in the mixture increases cure initiation time and increases cure time. Increasing the amount of dialkylhydrogen perfluoroalkylethylsiloxane in the process decreases cure initiation time and decreases cure time.

The alkylhydrogensiloxane present in the cross-linker mixture is limited only in that it must have at least three silicon-bonded hydrogen atoms per molecule, with the remaining bonds of the silicon atoms being to oxygen or alkyl radicals comprising one to four carbon atoms. Non-limiting examples of useful alkylhydrogensiloxanes include those described by formulas:

$$R^1_3Si(OSiR^1_2)_e(OSiR^1H)_fOSiR^1_3, \qquad (4)$$

where each $R^1$ is an independently selected alkyl radical as previously described, $e \geq 0$, $f=3$ to 200, and $e+f=3$ to 200;

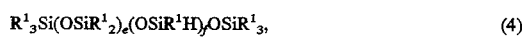  (5)

where each $R^1$ is an independently selected alkyl radical as previously described, $g=0$ to 18, $h=3$ to 20, and $g+h=4$ to 20;

$$Si(OSiR^1_2H)_4 \qquad (6)$$

where $R^1$ is as previously described; and

  (7)

where $R^1$ is as previously described, i=6 to 20, j=15–45, k=30 to 80, m=2 to 6.

In formulas (4), (5), (6), and (7) it is preferred that $R^1$ be methyl. In formula (4) it is preferred that $f/(e+f)>0.6$ and even more preferred is when $e+f=6$ to 20 and $f/(e+f)>0.6$. In formula (5) it is preferred that $g=0$ and $h=4$ to 7.

The dialkylhydrogen perfluoroalkylethylsiloxane present in the cross-linker mixture is described by formula

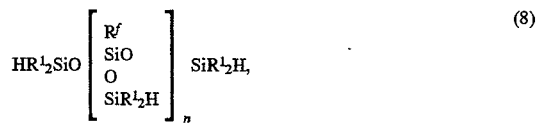  (8)

where $R^1$ and $R^f$ are as previously described and $n=1$ to 12. In formula (8) it is preferred that $R^1$ be methyl and $R^f$ be 3,3,3-trifluoropropyl. In formula (8) it is preferred that $n=1$ to 3. More preferred in formula (8) is when $x=2$ to 3.

In the cross-linker mixture, the weight ratio of the alkylhydrogensiloxane (cross-linker A) to dialkylhydrogen perfluoroalkylethylsiloxane (cross-linker B) can be controlled within a range of about 0.1:1 to 9:1 as a means of controlling the cure initiation and curing time of the present compositions. Preferred is when the weight ratio of cross-linker A to cross-linker B is within a range of about 1:3 to 3:1.

The molar ratio of silicon-bonded hydrogen atoms provided to the composition by the cross-linker mixture to total concentration of silicon-bonded alkenyl radicals present in the composition is important with respect to the properties of the cured fluorosilicone elastomers formed from the composition. The optimum ratio for the present composition will be determined at least in part by the concentration of silicon-bonded alkenyl radicals present in the composition and the composition of the cross-linker mixture. Generally a useful molar ratio of silicon-bonded hydrogen atoms to silicon-bonded alkenyl radicals is within a range of about 1:1 to 5:1.

Preferred embodiments of the present invention use a microencapsulated platinum containing catalyst and may be formulated as one-part curable compositions. However, to extend the shelf-life of such compositions and those compositions using non-encapsulated platinum group metal-containing catalysts it may be useful to add a catalyst inhibitor to the composition. Such platinum group metal-containing catalyst inhibitors are known in the art and include acetylenic compounds as disclosed in Kookootsedes et al., U.S. Pat. No. 3,445,420. Acetylenic alcohols such as 2-methyl-3-butyn-2-ol and 1-ethynyl-1-cyclohexanol are preferred inhibitors that suppress the activity of a platinum group metal-containing catalyst at ambient temperature while allowing curing to proceed rapidly at elevated temperatures.

Other platinum group metal-containing inhibitors that may be used in the present compositions include those described in Chung et al., U.S. Pat. No. 5,036,117; Janik, U.S. Pat. No. 4,584,361; and Lee et al., U.S. Pat. No. 3,989,667.

The amount of platinum group metal-containing catalyst inhibitor required is that needed to produce the desired shelf-life and/or pot-life and yet not extend the cure time of the composition to an impractical level. The amount of inhibitor required will vary widely and will depend upon the particular inhibitor that is used, the nature and concentration of the platinum group metal-containing catalyst, and the composition of the cross-linker mixture. Inhibitor added in amounts as small as one mole of inhibitor per mole of platinum group metal will in some instances cause a satisfactory inhibition of the catalyst. In other cases, as much as 500 moles of inhibitor per mole of platinum group metal may be needed to achieve the desired combination of pot life and cure time. When the catalyst is a microencapsulated platinum group metal-containing catalyst, low concentrations of inhibitors, particularly the acetylenic alcohols, may accelerate the curing reaction at elevated temperatures. This acceleration of curing can be determined by standard methods and the concentration of the inhibitor adjusted appropriately.

To provide for improved storage stability of the present compositions, the compositions may be packaged in two parts with the platinum group metal-containing catalyst in one part and the cross-linker mixture in the other part.

Compositions prepared by the present method can have added to them optional ingredients such as heat stabilizers, pigments, flame-retardants, mold release agents, chain extenders, and extending fillers such as ground quartz.

A preferred method for preparing the present curable compositions is to mix the reinforcing silica filler with the fluorine-containing polydiorganosiloxane to form a homogeneous blend and then add the silica treating agents or agents as described herein. The mixing operation can be conducted under relatively high shear using, for example, a dough-type mixer. When the silica treating agents are of the hydrolyzable type it may be necessary to add appropriate amounts of water to the composition to facilitate the hydrolysis. The mixing and reinforcing silica treating operation can require anywhere from about 15 minutes to 2 hours, depending upon such factors as the amount of material being processed, the viscosity of the material, and the shear rate of the mixer. It is preferred that the latter part of the mixing operation be conducted at a temperature within a range of about 100° C. to 250° C. under reduced pressure to remove volatiles from the composition.

After the above described composition is cooled to about ambient temperature the other components of the composition including the platinum group metal-containing catalyst, the cross-linker mixture, and any optional ingredients may be added.

The following examples are provided to illustrate the present invention. These examples are not intended to limit the scope of the claims herein. In the examples Me, Vi, and Rf represent methyl, vinyl, and 3,3,3-trifluoropropyl respectively and the Williams plasticity is that determined at 25° C. by ASTM D926.

Examples. A curable fluorosilicone composition as described in Table 1 was prepared by the method described above. The weight ratio of the alkylhydrogensiloxane (cross-linker A) to dialkylhydrogen perfluoroalkylethylsiloxane (cross-linker B) was varied as described in Table 2 and the cure initiation time, cure rate, and physical properties of the cured fluorosilicone elastomer determined. The cure initiation time is defined herein as the scorch time in minutes as determined by rheometer testing at 177° C. with a 3 degree arc and a sweep time of 12 minutes. The cure rate is expressed herein as the $T_{50}$ and $T_{90}$ times in minutes as determined by rheometry as described above, where the $T_{50}$ and $T_{90}$ times are the times required to reach 50% and 90% torque respectively. Cured fluorosilicone elastomers suitable for physical properties testing were prepared from the described compositions by curing in a mold for 10 minutes at 171° C. and post-curing for 4 hours at 200° C. Typical physical properties of these cured samples were determined by the following test methods: Shore A durometer (Duro.) ASTM 2240, tear (die B) ASTM 625, compression set ASTM 395, and tensile, elongation, and modulus (100%) by ASTM 412. The results of the physical properties testing are provided in Table 2.

TABLE 1

Formulation of Tested Compositions

| No. | Parts (Wt.) | Component Description |
|---|---|---|
| 1 | 100 | Methyl(3,3,3-trifluoropropyl)hydroxysiloxy terminated methyl(3,3,3-trifluoropropyl)(methylvinyl)polysiloxane comprising 1 mole percent of MeViSiO units and having a Williams plasticity of 300 mm/100 |
| 2 | 36.3 | Fumed silica, BET surface area of 400 m²/g |
| 3 | 0.8 | Fumed silica, BET surface area of 200 m²/g |
| 4 | 13.3 | Methyl(3,3,3-trifluoropropyl)hydroxysiloxy terminated methyl(3,3,3-trifluoropropyl)polysiloxane having a viscosity of 100 mPa · s at 25° C. |
| 5 | 1.0 | Methylvinylhydroxysiloxy terminated methylvinylpolysiloxane having a viscosity of 35 mPa · s at 25° C. |
| 6 | 3.0 | Encapsulated platinum containing catalyst comprising 4 weight percent platinum, where the catalyst is prepared by spray drying a solvent mixture comprising a neutralized complex of chloroplatinic acid hexahydrate with sym-tetramethyldivinylsiloxane and a dimethylphenylsiloxane resin |
| 7 | 0.5 | 1-Ethynyl-1-cyclohexanol |
| 8 | 1.6 | MeViSi(N(Me)C(O)Me)$_2$ |
| 9 | 13.1 | ground quarts, 5–10 micron particle size |
| 10 | 3.1 | blue pigment |
| 11 | 4.0 | Cross-linker mixture as described in Table 2 |

TABLE 2

Effect of Cross-linker Mixture on cure and Physical Properties

| Cross-linker* | Parts Cross-linker | | | | | | |
|---|---|---|---|---|---|---|---|
| A1 | 4 | 3 | 2 | 1 | 0 | 0 | 0 |
| A2 | 0 | 0 | 0 | 0 | 0 | 1 | 4 |
| B | 0 | 1 | 2 | 3 | 4 | 3 | 0 |
| Cure Properties | | | | | | | |
| Scorch Time (Min.) | 2.3 | 2.1 | 2.0 | 1.4 | 0.8 | 1.3 | 2.2 |
| $T_{50}$ (Min.) | 4.4 | 3.2 | 3.0 | 2.7 | 2.2 | 2.9 | 3.6 |
| $T_{90}$ (Min.) | 9.5 | 8.0 | 7.0 | 6.0 | 4.3 | 7.3 | 9.7 |
| Physical Properties | | | | | | | |
| Duro. (Shore A) | 72 | 70 | 72 | 70 | 74 | 74 | 73 |
| Tensile, MPa | 6.2 | 6.6 | 6.7 | 6.7 | 6.8 | 7.1 | 5.9 |
| Tear (Die B), kN/m | 21.2 | 21.5 | 21.5 | 21.0 | 20.8 | 20.1 | 17.5 |
| Elongation, % | 214 | 231 | 219 | 210 | 169 | 192 | 165 |
| Modulus (100%), MPa | 3.5 | 3.4 | 3.6 | 3.7 | 4.2 | 4.3 | 4.1 |
| Compression Set, % | 59 | 43 | 43 | 45 | — | 45 | 56 |

*A1 = Me$_3$Si(OSiMe$_2$)$_3$(OSiMeH)$_5$OSiMe$_3$
*A2 = (Me$_3$SiO$_{1/2}$)$_{12.7}$(Me$_2$SiO)$_{29.1}$(MeHSiO)$_{54.6}$(MeSiO$_{3/2}$)$_{3.6}$
*B = HMe$_2$SiO(SiR$^f$O)$_2$SiMe$_2$H
            |
        OSiMe$_2$H

We claim:

1. A method for controlling cure initiation time and curing time of a platinum group metal curable fluorosilicone composition, the method comprising forming a fluorosilicone composition comprising (A) 100 parts of a fluorine-containing polydiorganosiloxane comprising at least two alkenyl radicals per molecule, and repeating units described by formula $R^1R^fSiO$ and optionally $R^1R^2SiO$, where $R^1$ is an alkyl radical comprising from one to about four carbon atoms, $R^2$ is an alkenyl radical comprising from two to about 10 carbon atoms, and $R^f$ is a perfluoroalkyethyl radical comprising from three to about 12 carbon atoms, (B) 10 to 70 weight parts of a treated reinforcing silica filler, (C) an amount of a platinum group metal-containing hydrosilation catalyst sufficient to effect curing of the composition, and (D) a crosslinker mixture comprising an alkylhydrogensiloxane comprising at least 3 silicon-bonded hydrogen atoms per molecule with the remaining bonds of the silicon atoms being to oxygen or alkyl radicals comprising one to four carbon atoms and a dialkylhydrogen perfluoroalkylethylsiloxane; controlling the weight ratio of the alkylhydrogensiloxane to dialkylhydrogen perfluoroalkylethylsiloxane within a range of about 0.1:1 to 9:1 to control cure initiation time and curing time; and curing the fluorosilicone composition.

2. A method according to claim 1, where the weight ratio of the alkylhydrogensiloxane to dialkylhydrogen perfluoroalkylethylsiloxane is within a range of about 1:3 to 3:1.

3. A method according to claim 1, where the fluorine-containing polydiorganosiloxane is a polymer described by formula $QSi(OSiR^1R^2)_a(OSiR^1R^f)_bQ$;

where each $R^1$ is an independently selected alkyl radical comprising from one to about four carbon atoms, each $R^2$ is an independently selected alkenyl radical comprising from two to about 10 carbon atoms, $R^f$ is a perfluoroalkylethyl radical comprising from three to about 12 carbon atoms, each Q is independently selected from a group consisting of $R^1$, $R^2$, and OH, a≧0, a/(a+b)=0 to 0.05, and a+b is a value such that the polymer has a Williams plasticity number within a range of about 75 mm/100 to 400 mm/100 at 25° C.

4. A method according to claim 3, where $R^1$ is methyl, $R^2$ is vinyl, $R^f$ is 3,3,3-trifluoropropyl, Q is hydroxy, a/(a+b) is within a range of about 0.005 to 0.01 and a+b is a value such that the polymer has a Williams plasticity number within a range of about 200 mm/100 to 400 mm/100 at 25° C.

5. A method according to claim 1, where the fluorosilicone composition comprises 30 to 50 weight parts of the treated reinforcing silica filler per 100 weight parts of component (A).

6. A method according to claim 5, where the treated reinforcing silica filler has a surface area within a range of about 200 m²/g to 400 m²/g.

7. A method according to claim 1, where the reinforcing silica filler is treated with 20 to 50 weight percent, based on the weight of the silica filler, of a treating agent described by formula $HO(R^1R^fSiO)_xH$, where $R^1$ and $R^f$ are as previously described and X is a value greater than one.

8. A method according to claim 7, where $R^1$ is methyl $R^f$ is 3,3,3-trifluoropropyl, and x is a value such that the treating agent has a viscosity of about 100 mPa.s at 25° C.

9. A method according to claim 7, where the reinforcing silica filler is treated with 30 to 40 weight percent, based on the weight of the reinforcing silica filler of a treating agent described by formula $HO(R^1R^fSiO)_xH$ and 1 to 5 weight percent, based on the weight of the reinforcing silica filler of a treating agent described by formula $HO(R^1R^2SiO)_yH$; where $R^1$, $R^2$, $R^f$, and x are as previously described and y is a value greater than one.

10. A method according to claim 9, where $R^1$ is methyl, $R^2$ is vinyl, $R^f$ is 3,3,3-trifluoropropyl, x is a value such that the treating agent has a viscosity of about 100 mPa.s at 25° C., and y is a value such the treating agent has a viscosity of about 35 mPa.s at 25° C.

11. A method according to claim 1, where the platinum group metal-containing hydrosilation catalyst is selected from a group consisting of platinum metal, platinum compounds, and platinum complexes.

12. A method according to claim 11, where the platinum group metal-containing hydrosilation catalyst comprises a complex of a platinum compound with a low-molecular weight vinyl-containing organosiloxane.

13. A method according to claim 12, where the catalyst is microencapsulated in a matrix or coreshell structure.

14. A method according to claim 1, where the catalyst provides the equivalent of about 3 to 25 ppm of elemental platinum to the method.

15. A method according to claim 1, where the alkylhydrogensiloxane is described by formula $R^1_3Si(OSiR^1_2)_e(OSiR^1H)_fOSiR^1_3$, where each $R^1$ is an independently selected alkyl radical as previously described, e>0, f=3 to 200, and e+f=3 to 200.

16. A method according to claim 15, where $R^1$ is methyl, e+f=6 to 20, and f/(e+f)>0.6.

17. A method according to claim 1, where the alkylhydrogensiloxane is described by formula

where each $R^1$ is an independently selected alkyl radical as previously described, g=0 to 18, h=3 to 20, and g+h=4 to 20.

18. A method according to claim 17, where $R^1$ is methyl, g=0, and h=4 to 7.

19. A method according to claim 1, where the alkylhydrogensiloxane is described by formula $Si(OSiR^1_2H)_4$, where each $R^1$ is an independently selected alkyl radical as previously described.

20. A method according to claim 19, where $R^1$ is methyl.

21. A method according to claim 1, where the dialkylhydrogen perfluoroalkylethylsiloxane is described by formula

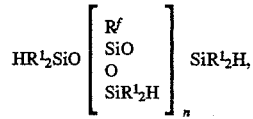

where each $R^1$ is an independently selected alkyl radical as previously described, each $R^f$ is an independently selected perfluoroalkylethyl radical as previously described, and n=1 to 12.

22. A method according to claim 21, where $R^1$ is methyl, $R^f$ is 3,3,3-trifluoropropyl, and n=2 to 3.

23. A method according to claim 22, where the alkylhydrogensiloxane is described by formula $R^1_3Si(OSiR^1_2)_e(OSiR^1H)_fOSiR^1_3$, where $R^1$ is methyl, e+f=6 to 20, and f/(e+f)>0.6.

24. A curable fluorosilicone composition comprising:

(A) 100 weight parts of a fluorine-containing polydiorganosiloxane comprising at least two alkenyl radicals per molecule and repeating units described by formula $R^1R^fSiO$ and optionally $R^1R^2SiO$, where $R^1$ is an alkyl radical comprising from one to about four carbon atoms, $R^2$ is an alkenyl radical comprising from two to about 10 carbon atoms, and $R^f$ is a perfluoroalkylethyl radical comprising from three to about 12 carbon atoms, (B) 10 to 70 parts of a treated reinforcing silica filler, (C) an amount of a platinum group metal-containing hydrosilation catalyst sufficient to effect curing of the composition, and (D) 0.5 to 10 weight parts of a cross-linker mixture comprising an alkylhydrogensiloxane comprising at least 3 silicon-bonded hydrogen atoms per molecule with the remaining bonds of the silicon atoms being to oxygen or alkyl radicals comprising one to four carbon atoms and a dialkylhydrogen perfluoroalkylethylsiloxane at a weight ratio within a range of about 0.1:1 to 9:1.

25. A curable fluorosilicone composition resulting from the mixing of components comprising:

(A) 100 weight parts of a fluorine-containing polydiorganosiloxane comprising at least two alkenyl radicals per molecule and repeating units described by formula $R^1R^fSiO$ and optionally $R^1R^2SiO$, where $R^1$ is an alkyl radical comprising from one to about four carbon atoms, $R^2$ is an alkenyl radical comprising from two to about 10 carbon atoms, and $R^f$ is a perfluoroalkyethyl radical comprising from three to about 12 carbon atoms, (B) 10 to 70 weight parts of a reinforcing silica filler, (C) 20 to 50 weight percent based on the weight of the silica reinforcing filler of a fluorine-containing treating agent described by formula $HO(R^1R^fSiO)_xH$, where $R^1$ and $R^f$ are as previously described and x is a value greater than one, (D) 0 to 10 weight percent based on the weight of the silica reinforcing filler of an alkenyl-containing treating agent described by formula $HO(R^1R^2SiO)_yH$, where $R^1$ and $R^2$ are as previously described and y has a value greater than one, (E) an amount of a platinum group metal-containing hydrosilation catalyst sufficient to effect curing of the composition, and (D) 0.5 to 10 weight parts of a cross-linker mixture comprising an alkylhydrogensiloxane comprising at least 3 silicon-bonded hydrogen atoms per molecule with the remaining bonds of the silicon atoms being to oxygen or alkyl radicals comprising one to four carbon atoms and a dialkylhydrogen perfluoroalkylethylsiloxane at a weight ratio within a range of about 0.1:1 to 9:1.

26. A method according to claim 1, where the alkylhydrogensiloxane is described by formula

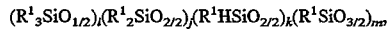

where each $R^1$ is an independently selected alkyl radical as previously described, i=6 to 20, j=15 to 45, k=30 to 80, and m=2 to 6.

27. A method according to claim 26 where $R^1$ is methyl.

* * * * *